United States Patent [19]

Hasegawa

[11] Patent Number: 4,896,025

[45] Date of Patent: Jan. 23, 1990

[54] INFORMATION REPRODUCING APPARATUS FOR INFORMATION RECORDING MEDIUM HAVING A PLURALITY OF INFORMATION TRACKS

[75] Inventor: Kōyō Hasegawa, Tokyo, Japan

[73] Assignee: Canon Kabushiki Kaisha, Tokyo, Japan

[21] Appl. No.: 331,014

[22] Filed: Mar. 30, 1989

Related U.S. Application Data

[63] Continuation of Ser. No. 15,925, Feb. 18, 1987, abandoned.

[30] Foreign Application Priority Data

Feb. 20, 1986 [JP] Japan .................................. 61-33779
Feb. 20, 1986 [JP] Japan .................................. 61-33780

[51] Int. Cl.⁴ ........................................... G06K 19/00
[52] U.S. Cl. .................................... 235/437; 235/454
[58] Field of Search ............... 235/435, 437, 454, 487; 369/53–59, 93, 100, 124; 371/48, 51; 360/27, 39, 47, 48, 53

[56] References Cited

U.S. PATENT DOCUMENTS 3,886,521 5/1975 Dobras .................................. 235/437
4,013,997 3/1977 Treadwell, III ................ 235/437 X
4,634,850 1/1987 Pierce et al. ......................... 235/487

Primary Examiner—Robert L. Richardson
Attorney, Agent, or Firm—Fitzpatrick, Cella, Harper & Scinto

[57] ABSTRACT

An information reproducing apparatus comprising a detecting device for detecting information recorded in a plurality of information tracks on a record carrier, and an extracting device for extracting correct information from the information detected by the detecting device. This extraction is executed by evaluating plural information detected from each information track to extract the most correct information from the information or by identifying the information track, the information of which is detected, to extract the correct entire information deteted from the information tracks.

11 Claims, 5 Drawing Sheets

INFORMATION REPRODUCING APPARATUS FOR INFORMATION RECORDING MEDIUM HAVING A PLURALITY OF INFORMATION TRACKS

This application is a continuation of application Ser. No. 015,925 filed Feb. 18, 1987 now abandoned.

BACKGROUND OF THE INVENTION

1. Field of the Invention

This invention relates to an apparatus for reproducing information recorded in an information recording carrier. Such an apparatus is preferably adapted to the information reproduction utilizing, e.g., optical means. In particular, this invention is directed to an information reproducing apparatus capable of always reproducing information data with accuracy.

2. Related Background Art

Recently, such information reproduction prevails as makes use of optical information recording carriers, such as optical files and compact discs. Further, these days such information reproduction begins to attract attention, which utilizes a card-like optical information reproducing carrier (hereinafter, referred to as an optical card) which has relatively excellent portability and large capacity.

In FIG. 1, an example of recording format for an optical card is schematically shown. On the optical card 1, a recording area 2 is formed, and in the recording area 2 a plurality of bands 3 are arranged. Each band 3 is formed by arranging a plurality of information tracks 4. Each track 4 has an information capacity of about several tens to a hundred bits. Each band 3 is separated from another one by a reference line 5 (hereinafter, referred to as R-line). An arrow A indicates a moving direction of the optical card 1 during the information reproduction, and an arrow C represents an information reading scan direction of an optical head during the same.

In FIG. 2, a reproducing apparatus is shown for reproducing the information recorded in such an optical card that has the record format as shown above. The optical card 1 is reciprocally movable along the direction A by a rotation device 6. The information recorded in the card 1 is read out to be reproduced by the head 11, track by track.

A light beam from a light source 7, such as an LED, is condensed by a lens system 8 to be projected onto the card 1. The information track 4 of the card 1 is imaged onto a linear sensor array 10 by an imaging optical system 9. The optical card 1 is moved in the direction A, so that correspondingly the image of information track 4 on the sensor array 10 changes. Plural read scannings are carried out in the sensor array 10 while each information track 4 is imaged on the sensor array 10. Thus, recorded information in some information tracks 4 belonging to a certain band 3 is exercised, and after completion thereof the optical head 11 is moved in the direction C by a proper distance in order to image the tracks 4 in another intended band 3 on the sensor array 10. Thus, the reproduction is similarly repeated.

FIG. 3 schematically illustrates an enlarged part of the record format of the optical card 1 as shown in FIG. 1. In this figure, a hatched portion corresponds to an information "1" or high level in the NRZI signal referred to later, and a blank one, an information "0" or low level in the same signal.

Such format as shown in FIG. 3 is that described in detail in U.S. Patent Appln. Ser. No. 904,359 (same assignee).

FIG. 3 shows one end portion of the record area 2 of the optical card 1, and therein a row of information bit arrangement in the direction C in an information track area 201 is the above-mentioned information track 4. A band area 203 consists of a R-line area 202 and the information track area 201. A unit data area 204 of the information track is formed of five bits. The information track is composed of a set of such unit data area. The R-line area 202 has a length of six bits in the direction C. Opposite bits of these six bits have the information "0" in the sense set forth above, and the other four bits have the information "1" in the above sense, which shape in stripe-like, i.e., the width in the direction A being shorter than that of one bit. Each stripe is disposed correspondingly to each information track.

The reading operation of the information track by the sensor array 10 is initiated upon detection of the information "011110" in the above sense, of the R-line area 202, judging that the alignment between the information track and the sensor array 10 is correctly achieved. Next, judging that the sensor array 10 is moved to next information track, by detecting again the information "011110" of this next information track after the information "011110" of the preceding R-line once disappears and then the information "000000" thereof is obtained, the same reading operation is effected. Such movement of the sensor array 10 to next information track is done by moving the optical card 1 relative to the optical head 11 in the direction A. In such manner, the R-line area 202 is an area not only for distinguishing each track from the adjacent track in the direction C but for distinguishing each track from the adjacent track in the direction A.

In order to reproduce the recorded information of the optical card 1 over plural band areas 203, the information tracks 4 in each band 3 are reproduced by moving the optical head 11 in the direction C. In this movement, it is necessary to control the position of the optical head 11 in such a manner that the image of the information track over all range of the intended band area 203 lies within the effective reading area of the sensor array 10. This control of the optical head's position is performed so as to position the R-line area 202 of the intended band within the predetermined range of the sensor array 10.

In the above reproduction system, the reproduced signal of the information is output only when the R-line is detected, and plural readings are conducted by the sensor array 10 per one information track according to the relationship between the relative moving velocity in the direction A of the card 1 and the reading scan velocity of the sensor array. Therefore, the firstly reproduced signal is generally caused to be the reproduced information of the concerned information track for each information track.

However, in the event that there are some flaws or dust on the optical card 1, or that a little defect is created in the information track area 201 during manufacture, it may occur that the above first reproduced signal does not accurately represent correct information.

Further, in the case that there are some defects or dust attached to the card or that the R-line is incorrectly formed, since the reproduced signal of the information is output only when the R-line is detected, the R-line could not be detected with the result that the information of the concerned track could not be reproduced and further that even the fact of the non-production of the concerned information track remains unknown.

Consequently, the serious problem often occurs that the reproduced information is inadequately corrected to produce incorrect information in the case where the error correction of the information in the optical card is done per one block consisting of plural information tracks. Moreover, in the case a lump of information is composed of a set of plural information tracks, such as a picture information track and a sound information track, in the recorded information of the optical card, the mal-synchronization of the picture, sound, and the like occurs owing to the information lacking.

SUMMARY OF THE INVENTION

An object of this invention is to provide such an information reproducing apparatus capable of always reproducing the information data with accuracy, considering the above-mentioned problems.

Another object of this invention is to provide an information reproducing apparatus of less erroneous reproduction.

Still another object of this invention is to provide such an information reproducing apparatus as can acknowledge the missing of reproduction if the R-line is not detected and the reproduction of information track is not performed, and thus is capable of coping with the missing of the information.

The object is achieved by an information reproducing apparatus which reproduces, by using a sensor, the information of an information recording carrier wherein plural information tracks are arranged transversely to the linearly extended information of the information track, and which extracts an accurate information data based on the result of plural readings of the information stored in each information track. Such extraction is attained by extracting the most correct information data from plural informations read out from each information track or by demodulating only information data actually detected by the sensor which passes plural information tracks serially arranged, out of plural read-out information data.

To achieve the object, such another information reproducing apparatus is provided that reproduces, by using a sensor, an information recording carrier having information tracks each of which includes linearly arranged information and evaluation information therefor, and that comprises means for calculating an error rate of the read-out information according to the evaluation information of the concerned information track, based on the result of plural readings of each information track by the sensor, means for storing the read-out information data of each reading, means for comparing the calculated error rates of the plural informations read out from the concerned information track, and means for outputting the information data of the smallest error rate according to the comparison result.

To achieve the object, such still another information reproducing apparatus is provided that reproduces, by using a sensor, an information recording carrier having information tracks arranged transversely to the linearly extending information of each information track, and that comprises means for moving the information recording carrier relative to the sensor in a direction extending transversely to the information track, means for outputting read-out signals from the sensor, and means for counting the number of the output of the readout signals.

Other features of this invention will be described hereinafter referring to each embodiment.

DETAILED DESCRIPTION OF THE PREFERRED EMBODIMENTS

Figure 5:
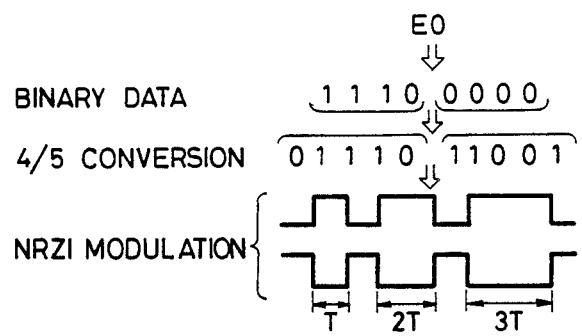
FIG. 5 illustrates a 4/5 NRZI modulating system.

Referring to FIG. 5, there is shown sexadecimal digital data EO which is subjected to 4/5 conversion and then NRZI modulation. Signals recorded according to NRZI modulation include only high and low level signals having lengths of T, 2T and 3T where T is a minimum inverted interval and corresponds to one bit in the record format shown in FIG. 3. In other words, information recorded in the information track area 201 does not include such signal as has the inverted interval longer than 3T.

Therefore, an area having such signal as has 4T inverted interval is used as a separating area 202 (i.e. R-line area) for separating each information track from another. That is, for example, the R-line area 202 includes the stripe-like information "1" having a length of four bits and a width of, e.g., a half bit, as explained above.

Thus, the separating area 202 involves the same consecutive signals which never appear in the information tracks, so that the detection of R-line will be accurate.

Figure 6:
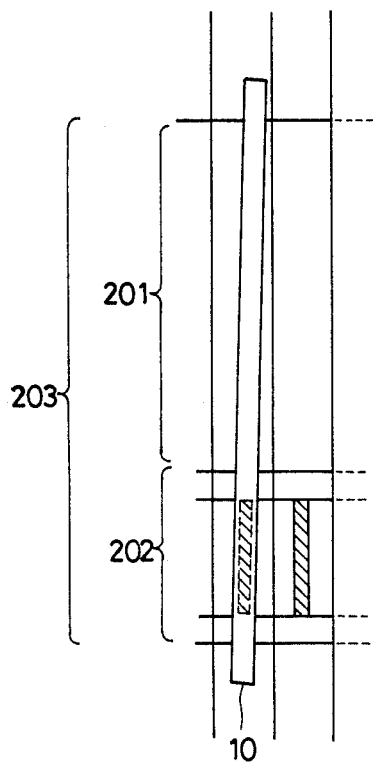
FIG. 6 illustrates the relationship between an information track and a sensor array.

Further, by forming the width of the stripe-like information "1" in the R-line area 202 smaller than the width of one bit, it is assured that the linear sensor array 10 is entirely located on the concerned information track when the separating signal "011110" of the R-line area 202 is fully read by the sensor array 10, even if the area to be read by the sensor array 10 is out of parallel relationship with the information track 4, as shown in FIG. 6.

Figure 2:
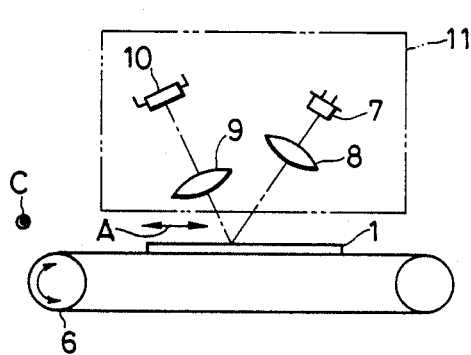
FIG. 2 is a schematic diagram of an information reproducing apparatus.
Figure 7:
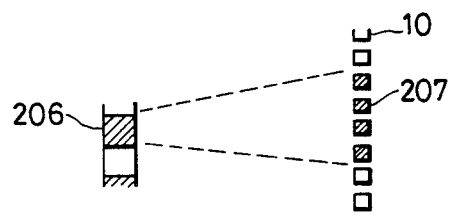
FIG. 7 illustrates the relationship between a sensor array and information record bits of an information recording carrier.

Next, one example of a concrete reproduction process of the optical card 1 will be described. Such process utilizes a reproducing apparatus shown in FIG. 2 to read information from the optical card 1 which is in the form of a recording carrier having the record format shown in FIG. 3. Further, the reproducing apparatus has an optical magnification selected so that one bit 206 on the record area 2 of the optical card 1 is imaged on four cells 207 of the sensor array 10, as shown in FIG. 7. For example, if the size of one bit 206 is 10 $\mu$m and that of the cell 207 in the sensor array 10 is 15 $\mu$m, the imaging system 9 may have a magnification equal to 4×15/10=6.

Figure 8:
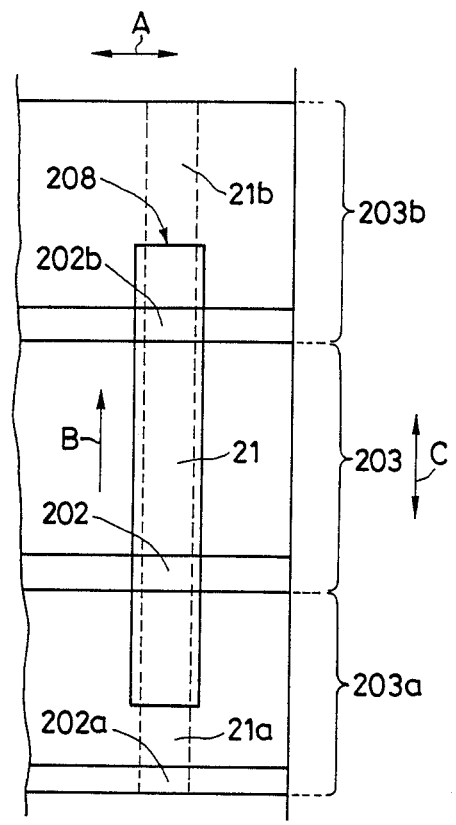
FIG. 8 is a view for explaining a reproduction process of a recording carrier.

FIG. 8 illustrates a reproducing process of the optical card 1.

Figure 3:
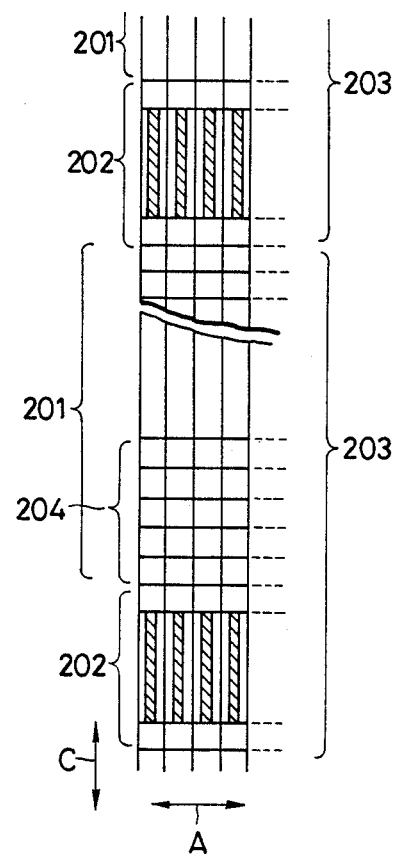
FIG. 3 is a diagrammatic enlarged view showing part of a record format on an optical card.

As seen from FIG. 8, the record area 2 of the optical card 1 is provided with the band area 203 constituting the band 3, adjacent band areas 203a and 203b information tracks 21, 21a and 21b and the separating areas 202, 202a, 202b constituting the R-line 5, all of which are formed in the format shown in FIG. 3. A track on one band is formed herein with a total of 86 bits which includes 6 bits in the separating area 202 and 80 bits in the information track 21. Accordingly, the track on one band will be imaged on 344 cells 207 of the sensor array 10.

The linear sensor array 10 used here is in the form of CCD having 512 cells 207 and a read-out region 208 is so set that parts of the information tracks 21a and 21b adjacent to the information track 21 to the read out, are as well imaged on the sensor array 10.

The relative positional relationship between the read-out region 208 and the addressed information track 21 can be detected from the signal of the separating area 202 on the sensor array 10.

The information reproducing apparatus according to this invention is characterized by a specific processing system of the information read out in the above way.

Figure 4:
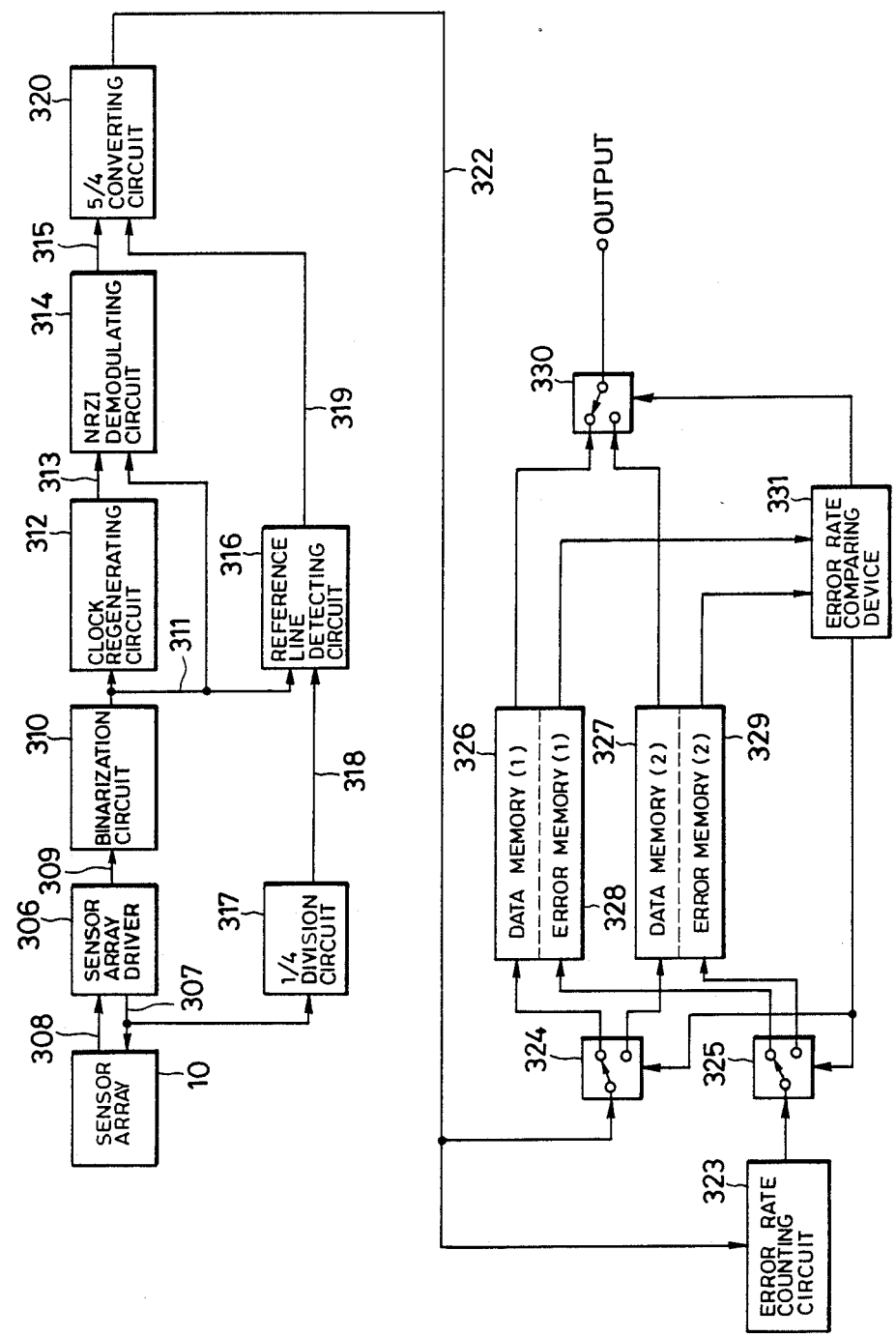
FIG. 4 is a block diagram of an embodiment of this invention.

In FIG. 4 showing an embodiment of an information reproducing apparatus, the sensor array 10 having the read-out region 208 is driven by drive clocks 307 from a sensor array driver 306. Its output signal 308 is amplified by the driver 306 and the amplified signal is supplied to the input of a binarization circuit 310 as a video signal 309. The video signal binarized by the binarization circuit 310 is supplied to a clock regenerating circuit 312, a NRZI demodulating circuit 314 and a R-line detecting circuit 316, as a NRZI signal 311.

The clock regenerating circuit 312 produces a clock signal 313 from a NRZI signal 311 and supplies the signal 313 to the demodulating circuit 314. The demodulating circuit 314 to which the clock and NRZI signals 313 and 311, supplies a NRZ signal 315 (see the signal designated by "4/5 conversion") to a 5/4 converting circuit 320 as a demodulated signal. On the other hand, the R-line detecting circuit 316 to which a clock signal 318 produced by frequency-dividing the drive clock 307 in a ¼ division circuit 317 and the NRZI signal 311 produced by the binarization circuit 310 are supplied, supplies a R-line detection signal 319 to the 5/4 converting circuit 320. The 5/4 converting circuit 320 5/4-converts the NRZ signal 315 pursuant to the R-line detection signal 319.

Figure 9:
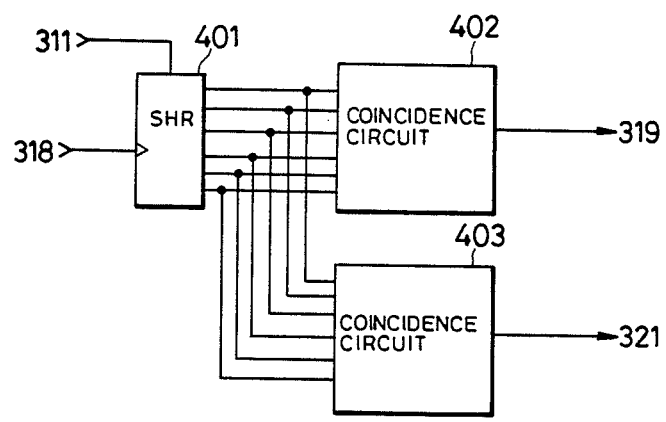
FIG. 9 is a block diagram of a R-line detecting circuit as shown in FIG. 4.

In FIG. 9 showing the details of the R-line detecting circuit 316, a shift register 401 includes a series input terminal for receiving the NRZI signal 311 and a clock input terminal for receiving the ¼ frequency-divided clock signal 318. The shift register 401 also includes 6-bit parallel output terminals connected with the respective input terminals of a coincidence circuit 402 of "011110". Coincidence signal from the coincidence circuit 402 is supplied to the 5/4 converting circuit 320 as the R-line detection signal 319. The 6-bit parallel output terminals of the register 401 are also connected to the input terminals of a coincidence circuit 403 of "000000". Coincidence signal 321 is generated from the coincidence circuit 403.

Turning to FIG. 4, when the sensor array 10 is driven by the drive clock 307 to scan the read-out region 208 shown in FIG. 8 in the direction B, part of the information in the information track 21a appears in the NRZI signal 311 as the read-out signal. Since this read-out signal includes only inverted intervals of T, 2T and 3T as described above, the minimum inverted interval T can be taken out by the clock regenerating circuit 312 utilizing PLL circuit and others so as to regenerate the clock signal 313. The clock signal 313 causes the NRZI signal 311 to be demodulated to the NRZ signal 315 in the demodulating circuit 314. However, the 5/4 converting circuit 320 will not operate unless the first R-line detection signal 319 is supplied thereto. In particular, bit signals in the read-out region 208 are sequentially input to the shift register 401 of the R-line detecting circuit 316 so that the shift register 401 is filled with signals of six bits at all times. Therefore, the R-line detection signal 319 will not be output unless the contents stored in the register 401 coincides with the contents "011110" recorded in the separating region 202 or 202b.

When 6-bit information "011110" recorded in the first separating area 202 is stored to the shift register 401, the R-line detection signal 319 is output from the coincidence circuit 402, thereby starting the conversion operation of the 5/4 converting circuit 320. Thus, the NRZI signal 315 corresponding to the information in the information track 21 to be read out is subjected to the 5/4 conversion to be output as a reproduced signal.

When the information "011110" in the next separating region 202b is stored in the shift register 401, the R-line detection signal 319 is supplied from the coincidence circuit 402 and the output of the reproduced signal of the 5/4 converting circuit 320 is halted.

In such a manner, the reproduction of the information in the concerned information track 21 is executed by self-clocking. Subsequently, the optical card 1 is moved in the direction A and/or the optical head to which the sensor array 10 is mounted is moved in the direction C to seek another desired information track. Thus, its information will be similarly reproduced.

The scanning in the sensor array 10 is not synchronized with the relative movement between the optical card 1 and the sensor array 10. Accordingly, depending on the selection of the scanning speed in the sensor array 10 in the direction B and the velocity of the optical card 1 in the direction A, a single information track may be scanned or read out a plurality of times. For example, where the sensor array 10, including 512 cells, is driven by the use of clock 307 having a frequency F of 10 MHz, the velocity V of the optical card is 40 mm/sec. and the size L of one bit in the optical card is 10 μm, the numbers of scannings per one information track is:

$$S = (L/V)/(512/F) = 4.88$$

Therefore, it is required to detect that the sensor array 10 is moved to the next information. This is executed in the following manner. When the coincidence circuit 403 detects the recorded contents "000000" in the separating area 202 or 202b, the incidence signal 321 is output. It should be noted that portions of the 6 bits of the separating area 202 adjacent to next 6 bits stand for the information "000000" as shown in FIGS. 3 and 6. Therefore, by obtaining the R-line detection signal 319 after the coincidence signal 321 from the coincidence circuit 403 is detected, it can be recognized that the sensor array 10 is shifted to a new information track.

On the other hand, plural output signals of the same kind obtained from one information track are sequentially supplied, as an output signal 322, to an error rate calculating circuit 323 and a change-over switch 324 through the 5/4 converting circuit 320. The output of the calculating circuit 323 is supplied to a change-over switch 325. Two output terminals of the change-over switch 324 are respectively connected with data memories (1) and (2) 326,327, and two output terminals of the change-over switch 325 are respectively connected with error memories (1) and (2) 328,329. The outputs of the data memories (1) and (2) 326,327 are respectively connected with two input terminals of a change-over switch 330. The outputs of the error memories (1) and (2) 328,329 are supplied to an error rate comparing device 331. The switches 324 and 325 are synchronously controlled by the output of the comparing device 331, and the switch 330 is controlled by the output of the comparing device 331. The information reproduced signals are output through the switch 330.

The operation of this embodiment will be explained.

The optical card used herein includes not only information or data information to be output, by reproduction, to an outside, but also information for evaluating the data information, i.e., such information as shows characteristic value of correct information to be recorded, in each information track. As the evaluation information, information for evaluating a recording error, reproducing error, etc., of the data information, such as parity bit and error correction code (ECC), can be utilized.

The error rate calculating circuit 323 calculates a value corresponding to the evaluation information from the data information of the output signal 322 of the 5/4 converting circuit 320. By comparing the calculated value with the value reproduced from the evaluation information as a reference, the error rate of the data information in the output signal 322 is measured.

Here, it is assumed that the signal 322 is output three times for each information track, depending on the relative moving velocity between the sensor array 10 and the optical card and a time interval of the repeated read-out signal outputs in the sensor array 10.

First, at the output time of the first signal 322 the switches 324 and 325 are closed to the sides of data memory (1) 326 and error memory (1) 328, and the error rate is calculated from the signal 322 by the error rate calculating circuit 323. This measured result of error rate will be stored in the error memory (1) 328.

Next, the contents of the error memory (1) is compared with that of the error memory (2) in the comparing device 331. In this case, there is no error rate stored in the error memory (2), so that the comparison is carried out under the condition that the error rate therein is assumed to be infinity ($\infty$). The comparing device 331 generates a control signal to close the switch 325 to the side of error memory (2) having a larger error rate. At this time the switch 324 is also synchronously closed to the side of data memory (2).

At the output time of the second signal 322, the signal 322 is stored in the data memory (2) 327 and the error rate calculated by the calculating circuit 323 is stored in the error memory (2) 329, similarly to the first output time.

Next, in the same manner the error rates stored in the error memories (1) and (2) are compared in the comparing device 331, and the switch 325 is controlled to be closed to the side of such error memory as has a larger error rate. At the same time the switch 324 is synchronously controlled. For example, assuming the error rate of the error memory (2) is larger, the switches 324 and 325 remain unchanged, while the switches 324 and 325 are respectively closed to the sides of data memory (1) and error memory (1) if that of the error memory (1) is larger. Here, the error rate of the error memory (2) is assumed to be larger.

At the output time of the third signal 322, the signal 322 is stored in the data memory (2) in place of the old data, and the error rate obtained by the calculating or measuring circuit 323 is stored in the error memory (2) in place of the old error rate.

Thus, after the outputs of three signals 322 concerning one information track, the error rates of error memories (1) and (2) are compared in the error comparing device 331, and the control signal is output from the device 331 so as to close the switch 330 to the side of such a data memory as corresponds to the error memory having a smaller error rate.

According to this embodiment, the information of the smallest error rate can be output to an outside out of plural signals reproduced from one information track.

After the output to the outside the contents of data memories (1), (2) and error memories (1), (2) will be cleared.

In the above embodiment, the error rate calculating means, error rate comparing means, etc., are composed of individual hardware such as the measuring circuit 323, switches 324, 325, 330 and the comparing device 331, however, the same function can be executed by a soft ware process using a microprocessor.

The present invention may similarly be applied to cases where an optomagnetic record carrier in which, e.g., the direction of magnetization is properly inverted, a recording carrier having recessed bits, and the like are used.

Further, the present invention may also be applied to cases where such sensors as a magnetic sensor are used instead of an light sensor.

According to the above embodiment, an information reproducing apparatus is attained that outputs few erroneously reproduced information.

In the above embodiment, if the error rates of two data to be compared are the same in a step of extracting such data information as has a minimum error rate, pursuant to a predetermined sequence the switches 324 and 325 shown in FIG. 4 are closed to the sides of the data memory (1) and error memory (1), or the data memory (2) and error memory (2). Namely, such control signal is generated from the error rate comparing device 331.

Further, in the case, when the last data information of plural signals reproduced from each information track is compared with the data stored in the data memory (1) or (2) and the error memory (1) or (2) just before the input of the last data, the error rates of both data are the same, such a control signal is generated from the error rate comparing device 331, as closes the switch 330 to either data memory (1) or data memory (2), pursuant to a predetermined sequence.

Although the above embodiment uses the 4/5 NRZI modulation system, any self-clockable modulation system, such as MFM, EFM and other modulation systems, can be similarly used. Of course, the single region (preamble) for fetching the reproducing clocks may be formed in the band, instead of using the self-clock system.

In the above embodiment, two sets of data memory and error memory are provided, and the data of minimum error rate is extracted from plural data by serially comparing the error rates of two data.

But, for example, where three data are output from each information track, three sets of data memory and error memory may be provided and the data of minimum error rate may be extracted from plural data by simultaneously comparing the error rates of the three data.

In the above embodiment, as shown in FIG. 4, the data reproduced by the 5/4 converting circuit 320 is directly input to the error rate calculating circuit, but such systems may be adoptable, in which plural data obtained from one information track are once stored to, e.g., RAM (random access memory) and then are consecutively input to the error rate measuring circuit or to the extracting means for extracting the data of minimum error rate.

Figure 1:
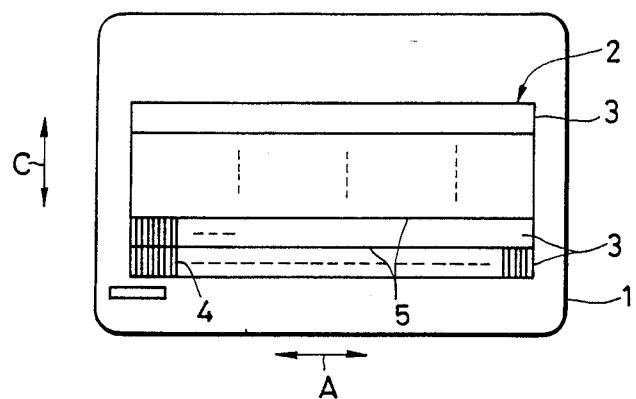
FIG. 1 is a diagrammatic plan view showing a record format on an optical card.

In the optical card 1 shown in FIG. 1, a series of information is recorded over plural information tracks or bands. Therefore, in FIG. 4, data output by the switch 330 is once stored in the memory, such as RAM. The series of information data stored in the RAM are output according to a command signal from a controller, such as CPU, and are recorded or displayed by a given record device or a display device.

Another embodiment will be hereinafter described.

Figure 10:
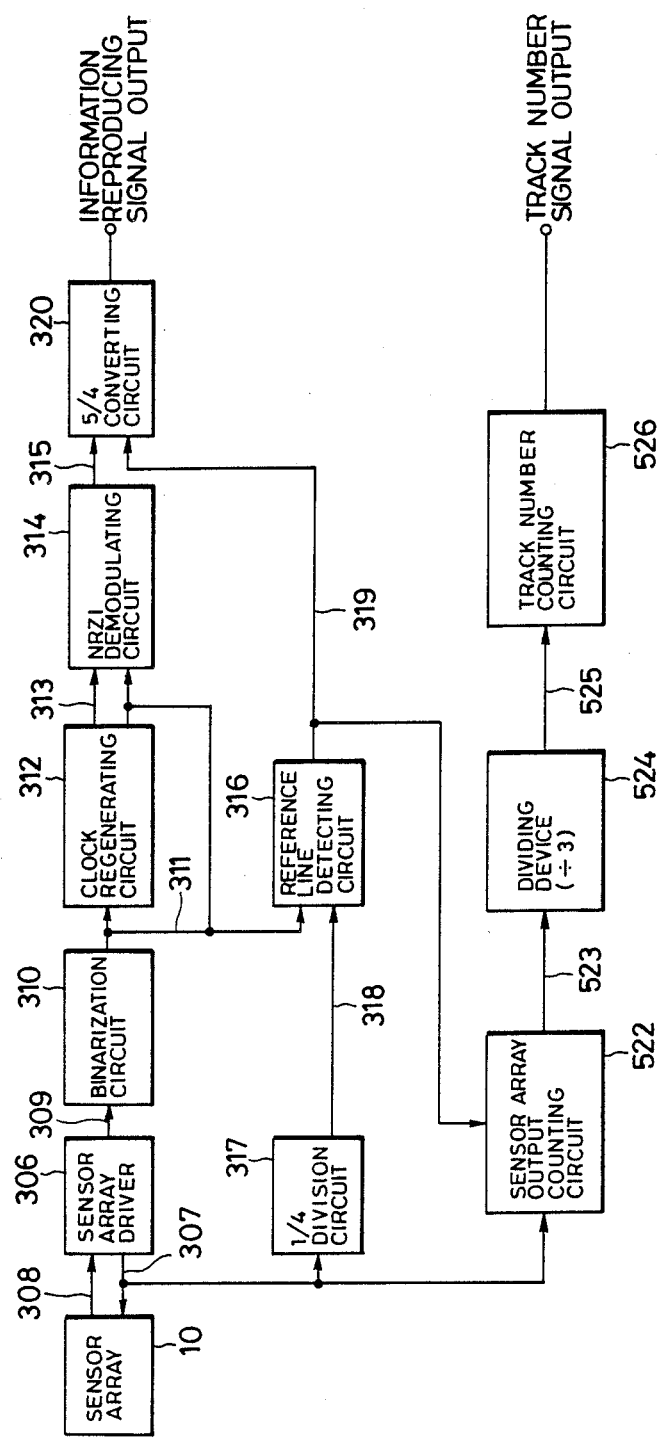
FIG. 10 is a block diagram of another embodiment of this invention.

In FIG. 10 showing another embodiment, the same blocks and signals as in FIG. 4 are designated by the same reference numerals as in FIG. 4, and explanations thereof are omitted.

Further, in this embodiment, the main sequence in which the data is read out by the sensor array 10 and then the reproduced signal of information is output from the 5/4 converting circuit 320, is the same as in FIG. 4. Accordingly, the explanation of this sequence is also omitted hereinafter.

In FIG. 10, a sensor array output counting circuit 522 counts the number of signal outputs read out by the sensor array 10 during a period from the time the concerned information track's recorded information is reproduced based on the first detection of a pair of R-lines (namely, the areas 202 and 202b in FIG. 8) corresponding to the concerned information track until the time a pair of R-lines as to another information track are again firstly detected after once a pair of R-lines have ceased to be detected. This is done by counting the number of drive clocks 307 of the sensor array driver 306 generated during a time interval between the state in which the read-out signal output of the sensor array 10 is generated and no output of the R-line detection signal 319 exists and the state in which both of the former and latter outputs firstly exist.

For example, provided that three read-out signals are supplied from the sensor array per one information track, three read-out signal outputs are supplied between the consecutive two time intervals mentioned above, when the R-lines are accurately detected without missing. In this connection, it should be noted that the stripe-like information "1111" in the separating area 202 shown in FIG. 6 has a width of a half of one bit. Thus, the output 523 from the output counting circuit 522 amounts to three per each counting. Where the R-line corresponding to a certain information track is not detected and thus no output of the information reproduced signal of the concerned information track is generated (i.e., the reproduction of one information track is omitted), the output 523 from the output counting circuit 522 amounts to six in this counting. Where the reproduction of the consecutive two information tracks is missed, the output 523 of the counting circuit 522 amounts to nine in such counting. Thus, a numeral three times as much as the number of missed information tracks, added by three, is output from the counting circuit 522 per each counting.

The output signal 523 is input to a dividing device 524 and is therein divided by three. Thus, the output 525 from the dividing device 524 stands for the number of information tracks passed by the sensor array 10 per each counting.

The output signal 525 is input to a track number counting circuit 526. In the counting circuit 526, the output signals 525 are integrated and thus the track number signal is output from the counting circuit 526. As seen from above, the track number signal corresponds to the number of information tracks passed by the sensor array 10 during a period which starts at a point wherein the integration is initiated in the counting circuit 526.

On the other hand, the 5/4 converting circuit 320 outputs the information reproduced signal only when the R-line detection signal 319 is as well output, and at the read-out time at which no R-line is detected, the information reproduced signal is never output. Therefore, the information reproduced signal outputs are not necessarily supplied exactly in the order of the arrangement of information tracks, but the track number signal, which is output correspondingly to the reproduced signal output of each information, accurately corresponds to the concerned information track in which the concerned information is recorded. Accordingly, it can be exactly judged to which information track the reproduced information is belonged, so that the identification of such information track as is missed in reproduction is possible.

In this embodiment, means for counting the number of read-out signal outputs in the sensor, means for identifying the information track number based on the numeral obtained from the above counting means, etc., are composed of individual hard wares, such as the sensor array output counting circuit 522, dividing device 524 and track number counting circuit 526, but the same function can be attained by the software processing using the microprocessor, etc.

As to the recording carrier and the sensor, the same can also be said as in the first embodiment.

According to this second embodiment, even if some information tracks in the recording carrier are not reproduced, such fact can be known and further the reproduced information tracks can be accurately identified. Therefore, also in the cases where error corrections are conducted in a lump over plural information tracks and where a lump of information of plural information tracks consists of picture and sound informations to be recorded, such effective treatments can be possible in which interpolated information of the non-reproduced information is composed based on the front and rear reproduced informations.

In the second embodiment, the explanation has been made on the assumption that three readings are achieved by the sensor array when the R-line is accurately detected and the concerned information track's information is read out, during the above-mentioned predetermined time interval.

If the data to be reproduced by the 5/4 converting circuit 320 from the concerned information track is one, the track number signal is serially accorded to such one data. If such data are plural as in the embodiment, the same track number signal is accorded to the respective data.

Further, the track member signal may be serially accorded to the minimum error rate data which is extracted from plural data, as in the embodiment shown in FIG. 4.

When the data reproduced by the 5/4 converting circuit 320 from the concerned information track are plural, the corresponding track number signal may be accorded to the firstly reproduced output data.

In the above manner, the reproduced data to which the track number is accorded, is once stored in a memory, such as RAM, and then the error correction is executed, such as the above composition of interpolated information.

According to the second embodiment the non-reproduced information track and the reproduced information track can be acknowledged by using the clocks of the driver for driving the sensor array and the signal from the R-line detecting circuit. Therefore, the error detection and error correction are possible, so that the reliable reproducing apparatus can be provided.

Thus, according to the present invention, such an information reproducing apparatus can be realized as is capable of providing accurate information at all times by detecting error created at the time of information reproduction.

What is claimed is:

1. An information reproducing apparatus for reproducing information recorded on an information recording medium having a plurality of information tracks arranged in a predetermined direction, said information reproducing apparatus comprising:
   read out means for reading out the plurality of information tracks along the predetermined direction thereof during a period of time and for reproducing the information of each of the plurality of information tracks;
   counting means for counting the period of time of said reading out means; and
   track identifying means for identifying the plurality of information tracks read out by said read out means in accordance with a result of counting performed by said counting means.

2. An information reproducing apparatus according to claim 1, wherein said read out means reads out each of the plurality of information tracks a plurality of times and said track identifying means identifies the plurality of information tracks in accordance with the plurality of times and the result of counting performed by said counting means.

3. An information reproducing apparatus according to claim 2, wherein track identifying means identifies any of said plurality of information tracks in which the information has not been reproduced.

4. An information recording apparatus according to claim 2, wherein said track identifying means identifies any of said plurality of information tracks read out next to any other of said plurality of information tracks the information in which has not been reproduced.

5. An information reproducing apparatus for reproducing information recorded on an information recording medium having a plurality of tracks arranged in a predetermined direction, comprising:
   read out means for reading out the plurality of information tracks along the predetermined direction in order and for reproducing the information of each of the plurality of information tracks, the read out operation being effected by reading out one of said plurality of information tracks one time;
   counting means for counting the number of read out operations affected by said read out means; and
   track identifying means for identifying the plurality of information tracks read out by said read out means in accordance with a result of counting performed by said counting means.

6. An apparatus according to claim 5, wherein said read out means reads out each of the plurality of information tracks a plurality of times and said track identifying means identifies the plurality of information tracks in accordance with the number of the read out operations effected by said read out means and the result of counting effected by said counting means.

7. An apparatus according to claim 5, wherein said identifying means identifies an information track in which the information has been read out but not been reproduced.

8. An apparatus according to claim 6, wherein said identifying means identifies a reproduced information track read out next to an information track in which the information has been read out but not been reproduced.

9. An information reproducing apparatus for reproducing information recorded on an information recording medium having a plurality of information tracks arranged in a predetermined direction, said information reproducing apparatus comprising:
   signal generating means for generating a plurality of signals in order;
   read out means for reading out the plurality of information tracks along the predetermined direction in order and for reproducing the information of each of the plurality of information tracks in accordance with a predetermined relation to the generation of the plurality of signals by said signal generating means;
   counting means for counting the number of the plurality of signals generated by said signal generating means; and
   track identifying means for identifying the plurality of information tracks read out by said read out means in accordance with a result of counting performed by said counting means.

10. An apparatus according to claim 9, wherein said signal generation means generates a driving clock as a signal used for said read out means.

11. An apparatus according to claim 10, wherein a read out operation is performed by reading out one of said plurality of information tracks one time by said related means and wherein said read out means reads out each of the plurality of information tracks a plurality of times and said track identifying means identifies the plurality of information tracks in accordance with a number of the read out operation performed and a result said counting means.

* * * * *

UNITED STATES PATENT AND TRADEMARK OFFICE
CERTIFICATE OF CORRECTION

PATENT NO. : 4,896,025
DATED : January 23, 1990
INVENTOR(S) : KOYO HASEGAWA

Page 1 of 2

It is certified that error appears in the above-identified patent and that said Letters Patent is hereby corrected as shown below:

COLUMN 1

Line 58, "exercised" should read --read--.

COLUMN 2

Line 15, "in" (second occurrence) should read --is--.

COLUMN 5

Line 7, "203b informa-" should read --203b, informa- --.
Line 19, "the read out," should read --be read out,--.

COLUMN 6

Line 61, "incidence signal 321" should read --coincidence signal 321--.

COLUMN 8

Line 32, "soft ware" should read --software--.
Line 40, "an" should read --a--.

COLUMN 10

Line 36, "is belonged," should read --belongs,--.
Line 43, "hard wares," should read --hardware,--.

COLUMN 11

Line 7, "track member signal" should read --track number signal--.

UNITED STATES PATENT AND TRADEMARK OFFICE
CERTIFICATE OF CORRECTION

PATENT NO. : 4,896,025
DATED : January 23, 1990
INVENTOR(S) : KOYO HASEGAWA

Page 2 of 2

It is certified that error appears in the above-identified patent and that said Letters Patent is hereby corrected as shown below:

COLUMN 12

Line 12, "affected" should read --effected--.
Line 15, "per-" should read --effected--.
Line 16, "formed" should be deleted.
Line 59, "related means" should read --read out means--.
Line 63, "operation" should read --operations-- and "result" should read --result obtained by--.

Signed and Sealed this

Twenty-seventh Day of September, 1994

Attest:

BRUCE LEHMAN

*Attesting Officer*　　　　　*Commissioner of Patents and Trademarks*